United States Patent
Hahn et al.

[11] Patent Number: 5,432,916
[45] Date of Patent: Jul. 11, 1995

[54] PRECHARGE FOR NON-DISRUPTIVE BUS LIVE INSERTION

[75] Inventors: Guenter Hahn, Sindelfingen; Klaus Muenzner, Schoenaich, both of Germany; Frank J. Pita, Cary, N.C.; Hartmut Ulland, Altdorf, Germany; Joseph C. Diepenbrock; Price Oman, both of Raleigh, N.C.; Richard Kelley, Coral Springs, Fla.

[73] Assignee: International Business Machines Corp., Armonk, N.Y.

[21] Appl. No.: 3,074

[22] Filed: Jan. 11, 1993

[30] Foreign Application Priority Data

Feb. 29, 1992 [EP] European Pat. Off. ............ 92103504

[51] Int. Cl.[6] ..................... G06F 13/00; H01R 9/09; H01R 13/02; H01R 13/642
[52] U.S. Cl. ................................. 395/325; 361/791; 439/374; 364/929.4; 364/927.95; 364/DIG. 2
[58] Field of Search .................. 395/325; 364/514; 361/58, 111, 2, 791; 307/42; 439/374

[56] References Cited

U.S. PATENT DOCUMENTS

| | | | |
|---|---|---|---|
| 3,818,319 | 6/1974 | Harrell et al. | 322/28 |
| 4,079,440 | 3/1978 | Ohnuma et al. | 361/424 |
| 4,200,865 | 4/1980 | Morioka et al. | 340/536 |
| 4,574,332 | 3/1986 | Calabro | 361/791 |
| 4,835,737 | 5/1989 | Herrig et al. | 395/325 |
| 4,999,787 | 5/1991 | McNally et al. | 364/514 |
| 5,099,187 | 3/1992 | Rippel | 320/1 |
| 5,142,435 | 8/1992 | Baumgartner et al. | 361/160 |
| 5,157,771 | 10/1992 | Losi et al. | 395/325 |
| 5,210,855 | 5/1993 | Bartol | 395/500 |
| 5,268,592 | 12/1993 | Bellamy et al. | 307/43 |
| 5,272,584 | 12/1993 | Austruy et al. | 361/58 |
| 5,277,615 | 1/1994 | Hastings et al. | 439/377 |
| 5,317,697 | 5/1994 | Husak et al. | 395/325 |

FOREIGN PATENT DOCUMENTS 0241905 10/1987 European Pat. Off. ...... G06F 13/40

Primary Examiner—Gopal C. Ray
Attorney, Agent, or Firm—Joscelyn G. Cockburn

[57] ABSTRACT

The invention is related to hot plugging of an electrical circuit (1) into a separate non-quiesced signal net (6) in an active system (7), such as a digital or analog bus. The inventive solution proposes the addition of a preconditioning network (4) to precondition the electrical circuit (1) to be hot plugged by partially precharging the parasitic input capacitances ($C_c$, $C_e$, $C_m$) of the electrical circuit (1) before hot plugging. The precharging of the parasitic input capacitances serves to minimize transient effects on the active system (7).

6 Claims, 1 Drawing Sheet

PRECHARGE FOR NON-DISRUPTIVE BUS LIVE INSERTION

BACKGROUND OF THE INVENTION

1. Field of the Invention

The invention concerns a hot pluggable electrical circuit and in particular a method for hot plugging of an electrical circuit into a separate non-quiesced signal net, such as an active digital or analog bus.

2. Prior Art

Various apparatus and methods for the rapid interconnection of electrical circuits, such as peripheral device interfaces or control circuits to computer busses, are known in the art. In a method to minimize the impact of plugging into a digital bus, the normal procedure has been to disable the bus so that new devices would not disrupt data flow on the bus.

A method and apparatus for controlled removal and insertion of circuit modules which are interconnected by a bus is known from U.S. Pat. No. 4,835,737. According to the teaching of this document, the operation of the bus is inhibited during the period that a module is being inserted into a connector connected to the bus and the bus is reactivated after the module has been inserted. When a module is to be inserted in an associated connector, a switch on the module is operated to provide an inhibit signal via the associated connector to a control circuit which inhibits operation of the bus. Upon full insertion of the module in the associated connector, the switch is operated to a second state in which the inhibit signal to the control circuit is reactivated. As a consequence, the control circuit again enables the bus to perform normal operations. However, quiescing of the bus during the insertion period has serious disadvantages-other than performance problems, since there is no graceful way to manage peripherals or I/O during the quiesce interruption. Also, since parts of a digital system are asynchronous with respect to each other, logical or sequential operation errors are possible. A digital or analog system is interrupted for many cycles because the mechanical insertion of a board is a relatively slow and imprecise event. Therefore, communication or peripheral flow control problems could result in overruns or underruns. As the speed of information transfers increases with the advance of technology, the impact of quiescing the bus during hot plugging becomes more and more severe.

In contrast the hot plugging concept provides both power and data transfer interconnections without causing interruption of ongoing data transfers on the bus. Hot plugging is found in fault tolerant systems which normally include device or field replaceable unit redundancy coupled through operational comparison and checking logic to ensure correct operation, see e.g. U.S. Pat. No. 4,453,215, U.S. Pat. No. 4,497,826, U.S. Pat. No. 4,597,084, and U.S. Pat. No. 4,654,857. When a fault is detected an indication of the failing device is provided to service personnel. The failing device is then simply removed from the bus and a replacement device connected. The removal of the failing device and the replacement of a new device are performed without regard to ongoing bus activity. Both the bus architecture and the control device electronics must be carefully designed to achieve this "hot plugging" capability. One approach allowed insertion to momentarily impact the bus, but relied on bus error recovery to absorb the transient and maintain system operation, as in U.S. Pat. No. 4,433,215. Other designs survive the insertion transients to the point where signal switching was not adversely affected.

From IBM Technical Disclosure Bulletin, Volume 29, No. 7, December 1986, page 2877, a circuitry is known for allowing a data cartridge to be hot plugged into an operating terminal without disrupting terminal operation. Other circuits are included in this circuitry to isolate the cartridge connector from the address, data and control busses to which it is logically connected. The buffer circuits are interposed between the cartridge connector and the busses-to avoid bus noise. The buffer is kept in a high impedance state unless the presence of a cartridge has been indicated by an interrupt signal provided directly to the micro processor.

Other known prior art approaches (U.S. Pat. No. 4,750,177 and U.S. Pat. No. 4,866,604) required split resistive terminations on the system to terminate the bus and allow faster switching. This was placed on the common printed circuit board that houses the board connectors. It also served to ensure system voltage levels without any system boards present. High current sink drivers/receivers were required, and special layout considerations and limitations were required for this concept to work. The system used overpowered drivers/receivers in conjunction with-the split terminations to "harden" the digital system so that it could withstand the insertion transients.

Another known prior art design sought to minimize the impact and terminate the digital net by using a series resistor on the board to be inserted. The value must be carefully chosen to allow hot plug while not effecting the switching characteristics. The main disadvantages are signal delay-and the loss of signal voltage across the resistor. These systems had to be carefully designed from the beginning so that hot plugging could work reliably. This becomes increasingly difficult as the bus cycle times decrease and logic speeds increase. In this environment it becomes-much more challenging to design a System that can sustain processing and support hot plug. Therefore existing digital or analog systems could not easily be adapted for hot plugging.

SUMMARY OF THE INVENTION

It is therefore an object of the present invention to provide an improved hot pluggable circuit.

This and other objects are advantageously solved by applying the features laid down in the independent claims. Advantageous embodiments of the present invention are set out in the dependent claims.

When an electrical circuit such as a printed circuit board is inserted live into a signal net of an analog or digital system, the active system signal voltage may be high, low, or in transition between these two states. No knowledge of the exact voltage level to be encountered is possible in an active system. Thus connection of a board to an analog or digital bus can occur when the system signals are in any of the states noted above.

A board in a system typically has a connection interface, some amount of printed circuit board wiring, and eventually a module I/O pin to connect a logic module to the printed circuit board. The connector and the printed circuit board etch wiring located above the power plane layers of the board in essence create a capacitor between the printed circuit board etch wiring and ground. A module I/O pin also presents some capacitance to ground, and may contain impedances to the supply voltage and to ground as well. Therefore insertion of an electrical circuit, such as a printed circuit board into a non-quiesced signal net instantaneously connects a capacitor load between the signal net and ground.

The impedance of a capacitor is initially zero when a voltage is first applied to it. Over time as the capacitor accumulates charge, its impedance increases. In the fully charged state, the capacitor presents a very high impedance, in some cases almost infinite. Typically the electrical circuit being plugged has the capacitive load in an uncharged state. The fundamental behavior of the capacitor is the reason for the transients seen while inserting electrical circuits into non-quiesced signal nets. So the transient impact of insertion to the active signal net is lessened the lower the switching net voltage, since insertion instantaneously connects the capacitive short circuit to ground. It is observed that the effect is much worse the higher the switching net voltage is. So there is a significant electrical transient in cases where the net voltage is high or in either transition between the high and low states. This transient has to be absorbed or managed by whatever driver devices are actively switching the active system net.

The present invention has significant benefits in minimizing the electrical transients resulting from insertion of an electrical circuit into a non-quiesced signal net.

The inventive solution proposes the addition of a preconditioning network to the electrical circuit to be hot plugged to precondition the electrical circuit by partially precharging the input capacitance of the electrical circuit being introduced into a live system. If a first port of a first signal net belonging to the inventive hot pluggable electrical circuit is to be plugged into a, second port of a separate non-quiesced second signal net, such as a digital or analog bus, the voltage of said second port can vary between a first and a second limiting value.

In order to precondition said first signal net prior to hot plugging, the preconditioning network of the inventive electrical circuit precharges an input capacitance of the first port to be hot plugged to a predefined voltage between said first and said second limiting value. Preferably said predefined voltage is set to approximately the arithmetic mean of said first and said second limiting value. However, though in some cases it is advantageous to set the predefined voltage to a level below or above the arithmetic mean. The predefined voltage can be chosen in consideration of the driver output characteristics of the port into which the electrical circuit is to be hot plugged. If the driver output characteristic is symmetric, the driver can remove as easily charge from the input capacitance of the first port during hot plug as the driver can add charge thereto. In this case the predefined voltage is advantageously set to the arithmetic means of the first and second limiting value. If the driver output characteristic is asymmetric, the situation is different: For a driver which can more easily add charge than remove charge, a predefined voltage below the arithmetic mean is advantageous. In the opposite case—a driver which can more easily remove charge than add charge—a predefined voltage above the arithmetic mean is, advantageous. The input capacitance which is precharged comprises the cumulative parasitic input capacitance of the first port. According to a preferred ,embodiment of the invention the port of the inventive hot pluggable electrical circuit which is to be plugged into a port of a separate non-quiesced second, signal net comprises at least two terminals, such as ground and a signal line.

BRIEF DESCRIPTION OF THE DRAWINGS

The sole figure shows an arrangement embodying the teachings of the present invention. One embodiment of the present invention entails a design of a voltage divider circuit to precharge the parasitic capacitance of the signal net which is to be hot plugged. The voltage divider comprises a first impedance to a stable positive power supply voltage and a second impedance to a stable negative power supply voltage. The stable positive and negative power supply voltages can be established by making power and ground connections first during board insertion. The active signal net is connected later by using some staggered connection means. The relative delay between the two connections can be optimized for applications as needed. Powering up the electrical circuit to be hot plugged before engaging signal nets also assures that electrostatic discharge effects are safely grounded before logic nets are connected. Thereby stable power supply voltages can also be guaranteed before engagement of the signal nets. This eliminates the latch up exposure if CMOS logic is used on the inserted board, especially since nets can be precharged to the voltage desired. By connecting signal nets last, there is no need to use drivers or receivers that power on or off glitch free to maintain signal integrity. If power supply voltages are provided to the electrical circuit before signal nets are connected, the drivers or receivers of the electrical circuit Which is to be hot plugged are already powered up when the signal nets of the electrical circuit finally are connected. This is advantageous in that a randomly floating output during powering up of the electrical circuit cannot disturb the non-quiesced second signal net. Moreover, this is advantageous in that a correct power on reset can be applied to the electrical circuit before the connection of the signal nets is established.

The inventive concept has benefits in minimizing the electrical transients resulting from hot plugging of an electrical circuit into a non-quiesced signal net, such as insertion of a printed circuit board into a non-quiesced analog or digital bus system. The concept minimizes the impact of transient effects on a non-quiesced system by addressing the root causes of electrical insertion transients.

Figure 1:
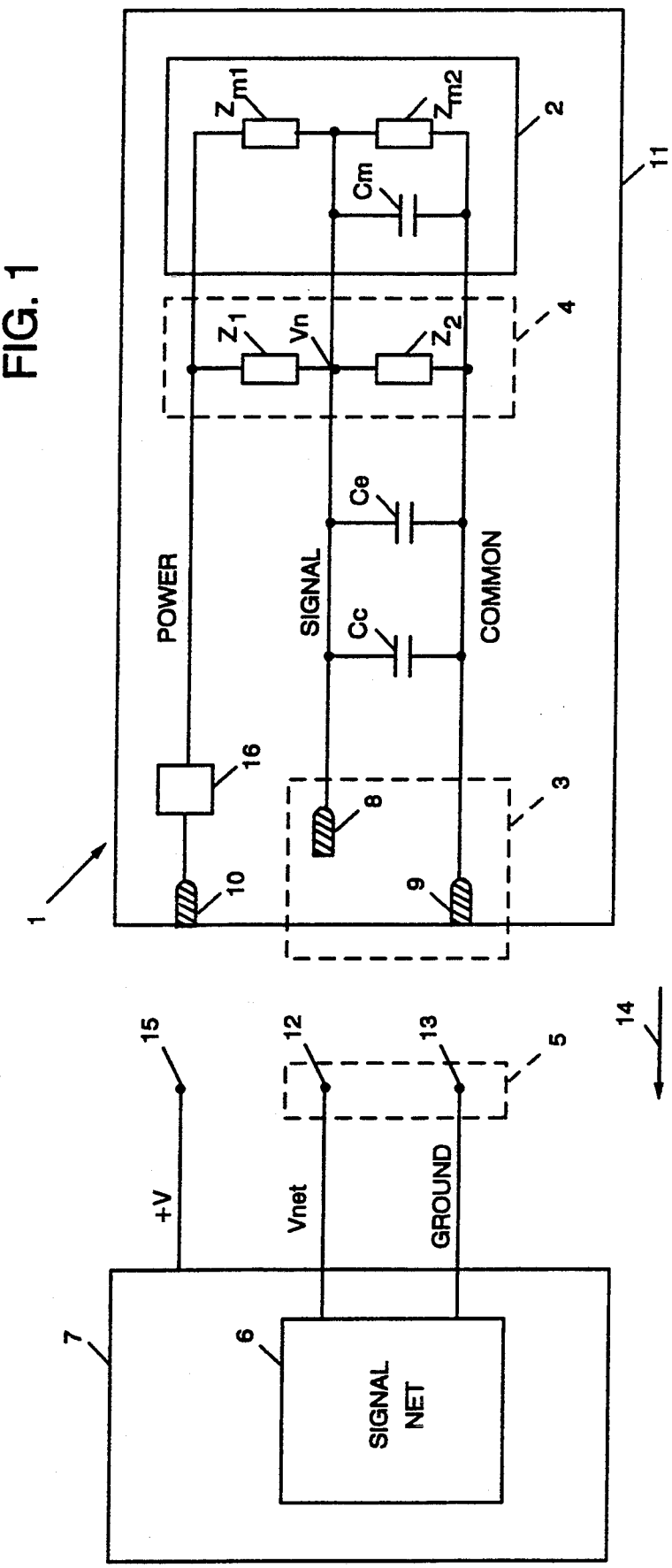

The inventive concept addresses the root causes of electrical insertion transients by minimizing and managing the transient load on the driver of the port of the active system in which the electrical circuit is to be hot plugged. The transient load on the driver depends on the initial charge and voltage of the input capacitance of the port of the electrical circuit to be hot plugged. If the voltage of the input capacitance equals the actual driver voltage of the active system in which the port is to be plugged no transient load occurs. If the voltage of the port is at its maximum limiting value—e.g. logic high in a digital system—and the voltage of the input capacitance is zero, a maximum transient load will occur, since in this case the initial impedance of the capacitive load is near zero. In the opposite case the voltage, of the port is at its minimum limiting value (e.g. logic low) and the voltage of the input capacitance is at its maximum limiting value (e.g. logic high). Thus, in this case the driver also has to draw a strong current during hot plug, since the capacitance is to be discharged. According to the inventive concept the problem of electrical transients is helped by precharging the input capacitance to a value between the maximum limiting value of the driver output and its minimum limiting value.

In theory the arithmetic mean of the maximum and minimum limiting values would be an optimal value for the predefined voltage to which the input capacitance is precharged. Setting the predefined voltage to the arithmetic mean limits the maximum differential voltage which can occur between the port of the electrical circuit which is to be hot plugged and the corresponding port in the non-quiesced system to half the signal voltage's amplitude. Thus the transient load thereby is significantly reduced, since even in the worst case (the voltage of the port of the active system being at either of its limiting values) the differential voltage is only half the signal voltage's amplitude.

In practice however, the driver of the port of the active system may have an asymmetric output impedance, so that it can more easily add charge into the input capacitance than remove charge from it or vice versa. In this case it is advantageous to deviate from the theoretical optimal value and to set the predefined voltage to a level below or above the arithmetic mean. Also, the selection of the driver technology (e.g., certain types of CMOS) may dictate a voltage level above or below the arithmetic mean to satisfy electrical interfacing requirements according to the restrictions of specification requirements of DC-voltage levels.

The invention has value both alone and when used to complement earlier transient management methods, such as methods concerning the management of transients occurring when power or signal connections are hot plugged, the dissipation of electrostatic charges or the dissipation of charge during unplugging. The invention provides an economical solution that adapts existing busses to hot plug, since the bus system itself need not necessarily be changed in order to implement the invention. Therefore whether hot pluggable electrical circuits according to the teaching of the invention or circuits not being pluggable are used in an existing bus system merely depends on the customer's choice of design. Further the invention is particularly valuable in a multimedia environment, since multimedia applications demand the frequent exchange of different feature adapters, such as audio jacks or printer port adapters. This can be done on line while processing without powering down the main processing system.

An advantageous embodiment of the invention is subsequently described in connection with the drawing in which the only figure is a schematic diagram of an inventive hot pluggable electrical circuit and the signal net in which the circuit is to be hot plugged.

The only figure shows the connector of an active system having terminals 15, 13, 12 for a stable positive power supply voltage $+V$, a stable negative power supply voltage (ground) and for a signal voltage $V_{net}$ of the signal net 6 of the active system 7. The electrical circuit 1 to be hot plugged is disposed on a printed circuit board and comprises a connection interface 8, 9, 10 for establishing contacts with the terminals 12, 13, 15 of the connector of the active system 7 and the signal line, the common line, and the power line, respectively. The power line is connected to an optional unit 16 which generates internal power for the electrical circuit 1 from the externally provided supply voltage $+V$ for those cases in which the internal voltage levels are different than those provided by the active system 7. The connection interface 8, 9, 10 comprises staggered connection means. The staggered connection means include recessed edge connectors for insertion into the respective terminals of the connector of the active system. In this preferred embodiment the connector 8 for the signal line to the signal voltage $V_{net}$ of the active system is recessed from the edge 11 of the board, so that the connections between the common line of the hot pluggable electrical circuit and the ground line of the active system 7 via terminals 9 and 13, as well as the connection between the power line and the stable positive power supply voltage $+V$ via terminals 10 and 15 are made prior to the connection of the signal line to the signal voltage $V_{net}$ of said second signal net via terminals 8 and 12. Staggered connection means of this kind are known per se for example from U.S. Pat. No. 3,993,935. However, there can be applied any type of connection means which assures that power connections are made prior to signal connection during hot plug.

The electrical circuit further comprises a signal net, preferably comprising a logic module 2 which is connected via a module I/O pin to the signal line. Thus, the printed circuit board has several parasitic capacitances: The parasitic capacitance of the connection interface $C_c$, the parasitic capacitance of the printed circuit board edge wiring $C_e$ and the parasitic capacitance of the module and its I/O pin $C_m$. The total board capacitive load is the sum of all the parasitic capacitances, since they are in parallel.

The preconditioning network 4 of the inventive hot pluggable electrical circuit shown in the figure comprises two preconditioning impedances $Z_1$ and $Z_2$. The impedance $Z_1$ is provided between the power line and the signal line and the impedance $Z_2$ is provided between the signal line and the common line. Further the input impedances $Z_{m1}$, $Z_{m2}$ of the module 2 between the power and signal line and the signal and common line, respectively, are shown in the drawing. The impedances $Z_1$, $Z_{m1}$ and $Z_2$, $Z_{m2}$ constitute a voltage divider serving to generate a predefined voltage $V_n$ to precharge the circuit 1 prior to hot plugging. In this preferred embodiment the impedances $Z_1$ and $Z_2$ are connected in parallel to the impedances $Z_{m1}$ and $Z_{m2}$ of the module 2. The impedances $Z_{m1}$ and $Z_{m2}$ normally cannot be changed since $Z_{m1}$ and $Z_{m2}$ are fixed circuit parameters of the module 2. These parameters are often given by module manufacturers. Thus in this case the impedances $Z_1$ and $Z_2$ are chosen to obtain the desired predefined voltage $V_n$. Depending on the values of $Z_{m1}$ and $Z_{m2}$, $Z_1$ and $Z_2$ can therefore have a wide variety of values. It is however advantageous to choose the values of $Z_1$ and $Z_2$ so that the resulting impedances of $Z_1$ connected in parallel to $Z_{m1}$ and $Z_2$ connected in parallel to $Z_{m2}$ are large in comparison to the output impedance of the port of the active system in which the circuit is to be plugged in. In some cases it is also possible to leave out $Z_1$ and/or $Z_2$ or in other words to make them infinitely large, if the values of $Z_{m1}$ and/or $Z_{m2}$ already contribute to the desired predefined voltage which is to be generated by the preconditioning network. In order to prevent short circuiting of the impedance $Z_1$ and/or $Z_2$, the logic module should be in a high impedance mode during hot plug.

When the connection of the signal line and the signal voltage is established sometimes bouncing of the corresponding contacts occurs. Therefore it is advantageous to choose $Z_1$ and $Z_2$ in consideration of the average time interval of bouncing being normally in the range of several milliseconds. If the values of $Z_1$ and $Z_2$ are chosen so that the RC-time constants of the preconditioning network are significantly smaller than the average time interval of bouncing, the correct predefined preconditioning voltage $V_n$ is generated before the contacts are finally established, despite the bouncing of the contacts.

The inventive hot pluggable electrical circuit may comprise additional first ports to be plugged into additional second ports in the active system. If the electrical circuit is to be hot plugged e.g. into an active parallel 64 bit data bus system, there are 64 first ports having 64 signal lines in-the electrical circuit. In this case the electrical circuit preferably comprises additional impedances to couple the signal lines of the additional first ports to the predefined voltage $V_n$, e.g. by interconnecting the respective signal lines and the voltage $V_n$ of the preconditioning network 4 by the additional impedances. The resulting impedances of the additional impedances connected to the first and second impedances $Z_1$ and $Z_2$ preferably are large in comparison to an output impedance of said second ports, so that signal transmission will not be significantly influenced by the preconditioning network. However, a drawback of this design is that the signal lines of the first ports are coupled via the additional impedances. It may be required, for example, that a preconditioning network be added to each electrical circuit of every port to be hot plugged, depending on the potential for and the consequence of signal disturbances occurring during hot plug operations.

The capacitors $C_c$, $C_e$ and $C_m$ as well as the impedances $Z_{m1}$ and $Z_{m2}$ shown in the drawing are merely representations of the equivalent physical circuit of the hot pluggable electrical circuit.

In operation a first port 3 of a signal net of the electrical circuit is to be preconditioned by the preconditioning network prior to hot plugging into a second port 5 of the active system 7. If the electrical circuit is moved in the direction shown by 14 to the connector of the active system, power and ground connections are made first due to the staggered connection interface 8, 9, 10 of the board. Therefore the voltage divider of the preconditioning network precharges the parasitic input capacitance of the first port to a predefined voltage $V_n$, whereby said predefined voltage is preferably set to the arithmetic mean of the limiting values of the signal voltage of the active system. However, other voltages are possible in order to minimize transient effects on the active system. The circuit components $Z_1$, $Z_2$ of the preconditioning network as well as the voltage $V_n$ can be chosen as follows in order to minimize transient currents and voltages during hot plug.

First, an analog model of the signal net 6 in the active system 7 and of the electrical circuit including logic module 2 connected to 8(Vn) to be hot plugged will be established. Second, representations of the circuit components of the preconditioning network will be introduced into said analog model. Finally, this model serves to choose the optimal circuit components of said preconditioning network, so that transients on said active signal nets are minimized after hot plugging of the first port 3 into the second port 5.

It can be helpful to establish several analog models of the signal net 6 corresponding to different possible configurations of the signal net 6. In general the electrical properties of the signal net 6 also depend on the number of electrical circuits, such as feature cards, which are already inserted into the signal net 6. The impact of hot plugging an additional electrical circuit into a second port of the signal net 6 can vary in different configurations of the signal net 6. If the signal net 6 comprises for example just one feature card which is already inserted into the signal net, the impact of a hot plugging operation is, generally speaking, more severe than in other configurations where more than one feature card is already inserted in the signal net 6. In the case that the signal net comprises a large number of feature cards the impact of hot plugging is also critical due to the additional load which has to be driven by the active system. Thus it is advantageous to select the circuit components of said preconditioning network in consideration of those worst case configurations of the signal net 6. As a result of this analog modelling it may also be necessary to modify the selection of drivers and/or receivers of the signal net 6 or the electrical circuit 2 to be hot plugged. Further the parasitic input capacitance of a printed circuit board carrying the electrical circuit 2 may be adjusted according to the results of the analog modelling by adjusting the capacitance between the copper wiring and the ground plane of the printed circuit board.

In order to establish a correct analog model of the signal net 6 it is best to assure that the analog model corresponds to the behavior of the physical circuits in a static operational mode where no hot plugging occurs. If the analog model is sufficiently correlated with the physical reality in the static operational mode it is possible to simulate hot plugging or with other words the dynamic operational mode. For establishing the analog model it is sometimes necessary to readjust the circuit representation of the analog model iteratively, so that it sufficiently corresponds to the actual physical circuit characteristics.

Having established an analog model of the signal net 6 in the active system for different system configurations, it is also possible to deduce design rules for electrical circuits 2 to be hot plugged into the active system. This greatly facilitates the design of hot pluggable electrical circuits 2 since the analog modelling has not to be repeated for every circuit design of new hot pluggable electrical circuits 2 for usage in the active system 7.

By partially charging the parasitic capacitances to the predefined voltage $V_n$ before the instant of connection of the signal line, these capacitances are no longer short circuits to ground. By setting the voltage $V_n$ to the middle of the switching voltage region of the active system, or somewhat above or below this region, the invention minimizes insertion transient effects on the signal net of the active system. Thereby it is possible to manage the causes of the transient effects.

When the electrical circuit is hot plugged there has to be a minimum time difference between contacting of the power supply terminals 9, 13 and 10, 15 respectively and contacting of the signal voltages via-terminals 8 and 12. This is to assure-that the input capacitance can be precharged to the predefined voltage $V_n$ prior to contacting of the signal terminals. A stable and valid voltage input level is also required by the precharging circuit prior to the signal nets of the ports being engaged. If the operator inserts the hot pluggable electrical circuit too quickly into the active system, it is possible, that the voltage $V_n$ is not reached prior to hot plugging. This problem can be solved, if the mechanical design of the slot in which the electrical circuit is inserted guarantees a minimum insertion time sufficient to allow the voltage $V_n$ to be reached. The slot may be designed in such a way that either the effect of the insertion speed or the insertion speed itself is reduced. For example, the slot design may include staggered connection pin lengths, slot latches, or mechanical means which control the amount of friction during insertion of the electrical circuit to reduce the speed of insertion.

Another problem is the management of electrostatic discharge during insertion and the removal of residual charges in the electrical circuit capacitances. If the electrical circuit is housed by a mechanical package which is conductive, this can serve for this purpose. The mechanical package usually slides in a conductive guide during insertion of the electrical circuit into the slot. If this guide is connected to the ground of the mechanical assembly, electrostatic charges are thereby removed without causing any damage.

In order to prevent arcing during removal of the electrical circuit from the active system, it is advantageous to provide a predetermined impedance path between the electrical circuit and its conductive package which is in conductive contact with the guide. This serves to dissipate the residual charges in the electrical circuit's capacitances. A sufficiently low impedance path can be provided to prevent arcing.

The design of the mechanical package is important in that it can prevent, for example, short circuiting with other hot pluggable electrical circuits which could result in system malfunctions. The design is also important in satisfying operator safety requirements.

Further it may be necessary to limit the inrush current into the electrical circuit during hot plugging to prevent overloading of the entire active system. A DC/DC regulator, 16 in the figure, can serve to control the inrush current so that overloading is prevented and the electrical circuit is nevertheless powered up at an acceptably quick rate. Such a regulator can also serve to limit the impact of a short circuit in the electrical circuit due to the galvanic isolation of the electrical circuit from the active system. Thus no excessive current is drawn from the electrical circuit if a short circuit should occur. A DC/DC regulator also allows an external power source to be attached to the active system such as an external power supply or battery backup unit. This also serves to isolate faults and thus prevent system failure.

It is to be understood that the inventive concept can be beneficially applied to both analog and digital systems. In digital systems the digital switching behavior of the system during board insertion and removal is preserved. In analog systems the signal distortion of the analog bus is minimized during hot plug by applying the inventive concept.

It will be understood by those skilled in the art that the simple impedances $Z_1$ and $Z_2$, in the figure describing the preferred embodiment, may be replaced by more complex circuitry which can also serve to add or subtract charge for the signal net which is being precharged. A more complex circuitry may comprise active components such as transistors and/or passive components such as impedances and/or diodes. Such networks may or may not operate in response to control signals derived from a staggered or sequential connection means. They may be included within the logic module attached to the signal net 2 or remain as a separate preconditioning network 4 as shown in the figure. These networks can also be designed to generate a predefined precharge voltage $V_n$ in accordance with the teaching of this invention.

We claim:

1. A hot pluggable electrical circuit (1) for mating with a separate active system (7), said separate active system (7) including a second port 5 coupled to a non-quiesced second signal net (6) such as a digital or analog bus varying between a first and a second limiting signal values; said hot pluggable electrical circuit comprising:
   a first Signal net (2) having a first port (3);
   a connection interface, including said first port having therein a first set of contacts for receiving power signals and a second set of contacts for receiving non-power signals from the active system said first set of contacts and said second set of contacts arranged in offsetting orientation so that the first set of contacts coact with like contacts in the active system before the second set of contacts coact with like contacts in said active system; and
   a preconditioning network means (4) coupled to the first signal net (2) and the first port; said preconditioning network means responsive to the power signals on the first set of contacts to generate a predetermined voltage (Vn) which is set to a value not disrupting signal line (Vnet), when the first port is being charged, and charges input capacitances of said first port to the predetermined voltage (Vn) prior to said first signal net receiving the non-power signals from the second set of contacts.

2. A hot pluggable electrical circuit (1) for mating with a separate active system (7), said separate active system (7) including a second port 5 coupled to a non-quiesced second signal net (6) such as a digital or analog bus varying between a first and a second limiting signal values: said hot pluggable electrical circuit comprising:
   a first signal net (2) having a first port (3) said first signal net(2) including a pair of impedance $Z_{m1}$ and $Z_{M2}$,
   a connection interface, including said first port, having therein a first set of contacts coupled to a power line and a common line for receiving power signals and a second set of contacts coupled to the common line and a signal line for receiving non-power signals from the active system said first set of contacts and said second set of contacts arranged in offsetting orientation so that the first set of contacts coact with like contacts in the active system before the second set of contacts coact with like contacts in said active system; and
   a preconditioning network means (4), coupled to the first signal net (2) and the first port, being responsive to the power signals on the first set of contacts to generate a predetermined voltage (Vn) which charges input capacitances of said first port to the predetermined voltage (Vn) prior to said first signal net receiving the non-power signals from the second set of contacts;
   said preconditioning network means including a precharge network. Such as a voltage divider having a first impedance ($Z_1$) provided between said power line and said signal line and a second impedance ($Z_2$) provided between said signal line and said common line with the resulting impedance of said first impedance ($Z_1$) connected in parallel to the impedance ($Z_{M1}$) of said signal net (2) and the resulting impedance of said second impedance ($Z_2$) connected in parallel to the impedance ($Z_{M2}$) of said signal net (2) are large in comparison to the output impedance of said second port.

3. A hot pluggable electrical circuit (1) for mating with a separate active system (7), said separate active system (7) including a second port 5 coupled to a non-quiesced second signal net (6) such as a digital or analog bus varying between a first and a second limiting signal values; said hot pluggable electrical circuit comprising:

a first signal net (2) including a pair of impedance $Z_{M1}$ and $Z_{M2}$:

a first port (3) coupled to the first signal net (2);

said first port (3) having a common line (common) for connection of said circuit with a stable negative power supply, such as ground, and a signal line (signal) for connection of said circuit with the signal voltage ($V_{net}$) of the second signal net, and said circuit further comprises a power line (power) for connection of said circuit with a positive power supply voltage (+V);

a connection interface, including said first port, having therein a first set of contacts for receiving power signals and a second set of contacts coupled to the common line and the signal line for receiving non-power signals from the active system, said first set of contacts and said second set of contacts arranged in offsetting orientation so that the first set of contacts coact with like contacts in the active system before the second set of contacts coact with like contacts in said active system; and a preconditioning network means (4), coupled to the first signal net (2) and the first port responsive to the power signals on the first set of contacts to generate a predetermined voltage (Vn) which charges input capacitances of said first port to the predetermined voltage (Vn) prior to said first signal net receiving the non-power signals from the second set of contacts;

said preconditioning network means including a precharge network, such as a voltage divider, having a first impedance ($Z_1$) provided between said power line and said signal line and a second impedance ($Z_2$) provided between said signal line and said common line with the resulting impedance of said first impedance ($Z_1$) connected in parallel to the impedance ($Z_{M1}$) of said signal net (2) and the resulting impedance of said second impedance ($Z_2$) connected in parallel to the impedance ($Z_{M2}$) of said signal net (2) are large in comparison to the output impedance of said second port.

4. A hot pluggable electrical circuit (1) for mating with a separate active system (7), said separate active system (7) including a plurality of second ports 5 coupled to a non-quiesced second signal net (6) such as a digital or analog bus varying between a first and a second limiting signal values; said hot pluggable electrical circuit comprising:

a first signal net (2) having a plurality of first ports (3);

a connection interface, including Said plurality first ports, having therein a first set of contacts for receiving power signals and a second set of contacts for receiving non-power signals from the active system, said first set of contacts and said second set of contacts arranged in offsetting orientation so that the first set of contacts coact with like contacts in the active system before the second set of contacts coact with like contacts in said active system; and a plurality of preconditioning network means (4) coupled to the first signal net (2) and each one of said plurality of preconditioning network means (4) coupled to one of the plurality of first ports; said plurality of preconditioning network means responsive to the power signals on the first set of contacts to generate a predetermined voltage (Vn) which charges input capacitances of said plurality of first ports to the predetermined voltage (Vn) prior to said first signal net receiving the non-power signals from the second set of contacts.

5. A hot pluggable electrical circuit (1) for mating with a separate active system (7), said separate active system (7) including a second port 5 coupled to a non-quiesced second signal net (6) such as a digital or analog bus varying between a first and a second limiting signal values; said hot pluggable electrical circuit comprising:

a first signal net (2) having a first port (3):

a connection interface, including a first port, having therein a first set of contacts for receiving power signals comprising of a positive and negative power supply voltages and a second set of contacts for receiving non-power signals from the active system with at least one contact of the second set of contacts for coupling the first signal net (2) to the non-quiesced second signal net (6) being recessed relative to other contacts of this connection interface, said first set of contacts and said second set of contacts arranged in offsetting orientation so that the first set of contacts coact with like contacts in the active system before the second set of contacts coact with like contacts in said active system; and a preconditioning network means (4) coupled to the first signal net (2) and the first port; said preconditioning network means responsive to the power signals on the first set of contacts to generate a predetermined voltage (Vn) which charges input capacitances of said first port to the predetermined voltage (Vn) approximately the arithmetic mean of the first and the second limiting signal values prior to said first signal net receiving the non-power signals from the second set of contacts.

6. A hot pluggable electrical circuit (1) for mating with a separate active system (7), said separate active system (7) including a second port 5 coupled to a non-quiesced second signal net (6) such as a digital or analog bus varying between a first and a second limiting signal values; said hot pluggable electrical circuit comprising:

a first signal net (2);

a first port (3) having a common line (common) for connection of said circuit with a stable negative power supply, such as ground, and a signal line (signal) for connection of said circuit with a signal voltage ($V_{net}$) of the second signal net, and said circuit further comprises a power line (power) for connection of said circuit with a positive power supply voltage (+V);

a dc/dc regulator (16) operatively coupled to the power line;

a connection interface, including said first port, having therein a first set of contacts for receiving power signals and a second set of contacts for receiving non-power signals from the active system, said first set of contacts and said second set of contacts arranged in offsetting orientation so that the first set of contacts coact with like contacts in the active system before The second set of contacts coact with like contacts in said active system; and a preconditioning network means (4) coupled to the first signal net (2) and the first port; said preconditioning network means responsive to the power signals on the first set of contacts to generate a predetermined voltage (Vn) which charges input capacitances of said first port to the predetermined voltage (Vn) approximately the arithmetic mean of the first and the second limiting signal values prior to said first signal net receiving the non-power signals from the second set of contacts.

* * * * *